United States Patent [19]

Gerety et al.

[11] Patent Number: 5,212,792

[45] Date of Patent: May 18, 1993

[54] METHOD AND APPARATUS FOR CONTROLLING EXECUTION OF TOOLS IN A COMPUTER-AIDED SOFTWARE ENGINEERING SYSTEM

[75] Inventors: M. Colin Gerety; Samuel C. Sands; Martin R. Cagan, all of Fort Collins, Colo.

[73] Assignee: Hewlett-Packard Company, Palo Alto, Calif.

[21] Appl. No.: 359,912

[22] Filed: Jun. 1, 1989

[51] Int. Cl.$^5$ .......................... G06F 9/44; G06F 15/16
[52] U.S. Cl. .......................... 395/650; 364/DIG. 1; 364/281.3; 364/280; 364/284.3; 364/284; 395/700
[58] Field of Search ... 364/200 MS File, 900 MS File; 395/700, 650, 600

[56] References Cited

U.S. PATENT DOCUMENTS

| | | |
|---|---|---|
| 4,530,051 | 7/1985 | Johnson et al. ............... 364/200 |
| 4,566,078 | 1/1986 | Crabtree ....................... 364/900 |
| 4,823,304 | 1/1989 | Frantz et al. ................. 364/900 |
| 4,914,583 | 1/1990 | Weisshaar et al. ............ 364/200 |
| 4,951,192 | 8/1990 | Chase, Jr. et al. ........... 395/700 |

OTHER PUBLICATIONS

Reiss et al., "An Environment for Workstations", 1985.
Brown et al., "Toward a Computer Science Environment for Powerful Personal Machines", Proc. 17th Int. Conf. on Syst. Sci., 1984, pp. 462-469.
Private Communication, "Overview of the FIELD Environment" by Steven P. Reiss, Nov., 1987.

Primary Examiner—Kevin A. Kriess

[57] ABSTRACT

A method and apparatus for communication between programs, or tools, in a computer system includes the steps of establishing a bi-directional communication path between each tool and a central message server, registering with the message server the patterns of messages which each tool wishes to receive, and storing the message patterns. A message is forwarded to the message server when one tool requires the service of another tool. The message server compares the pattern of the received message with the previously-stored message patterns, and, if the message matches a stored message pattern, the message is forwarded to each tool for which a match occurs. If a message requests the service of another tool and the message does not match the patterns of the previously-stored messages, an execution manager determines from a status table and an execution initialization table which tool can service the request message. The execution manager then invokes the tool and forwards the request message to the tool for execution.

22 Claims, 10 Drawing Sheets

METHOD AND APPARATUS FOR CONTROLLING EXECUTION OF TOOLS IN A COMPUTER-AIDED SOFTWARE ENGINEERING SYSTEM

CROSS-REFERENCE TO RELATED APPLICATIONS

The following applications are related to the present application: "Method and Apparatus for Computer Program Encapsulation", Ser. No. 07/358,962, filed May 26, 1989, now U.S. Pat. No. 5,075,847 Libraries Implemented With Linking Program Loader", Ser. No. 07/860,309, filed Mar. 27, 1992 which is a continuation of Ser. No. 07/359,829, filed Jun. 1, 1989 and "Method and Apparatus For Communication Between Tools in A Computer-Aided Software Engineering System", Ser. No. 07/871,599, filed Apr. 17, 1992 which is a continuation of Ser. No. 07/359,309, filed May 31, 1989.

FIELD OF THE INVENTION

The present invention relates to the field of computer-aided software engineering (CASE) and, in particular, to a program communication facility which improves communication and cooperation between software development tools in a CASE system. More specifically, the present invention provides methods and apparatus for controlling execution of software tools to ensure that a tool is available to service every request for action. While the present invention is well-suited for use in CASE systems, it is not limited to such use.

BACKGROUND OF THE INVENTION

Current computer operating systems, such as UNIX, provide facilities for program interconnection which enable several programs to run concurrently rather than sequentially. (UNIX is a registered trademark of AT&T in the U.S.A. and other countries.) In UNIX, the facility which supports program interconnection is called a pipe.

The UNIX pipe facility, which is a service of the UNIX kernel, provides a one-way data path connecting two separate programs by sending the output of a first program to the input of a second program. In this manner, complex tasks are accomplished by combining programs in sequence.

While the ability to integrate programs via the UNIX pipe model is one of the reasons for the popularity of the UNIX operating system, there are several drawbacks which have restricted the ability of UNIX to support sophisticated software development environments in which several software tools are required to run concurrently. In particular, the UNIX pipe mechanism is a one-way, point-to-point, single computer communication facility. Software tools often need interactive, two-way communication. In certain situations, two or more software tools may require the same data from a single source. Furthermore, the UNIX pipe facility does not support a distributed processing environment in which different software tools are run on different computers on a network.

In order to connect tools together using pipes, the tools require interfaces that the other tools understand. This has meant a primitive command line interface for most of the UNIX utilities. Applications that have added an interactive, window-based interface have lost the ability to communicate with other UNIX tools via pipes.

In the UNIX model, the developer has many small tools which he must combine to accomplish a task. For increased productivity, the trend is toward task-oriented systems where the user concentrates on the task he is trying to accomplish and does not worry about the combination of tools required to achieve the task.

Message-based communication between software tools has been proposed. In one proposed system, request messages are sent from a software tool to a message server. The message server forwards the message to those tools that wish to receive a message of that type. While such systems are generally satisfactory, they lack features necessary for operation in a large, distributed, multi-tasking computer system.

In a system including multiple software tools, it can be difficult to insure that a tool is available to service every request message. While the user can invoke tools as necessary, it is desirable to relieve the user of this duty so that he can concentrate on application tasks rather than coordinating and managing the software tools.

It is a general object of the present invention to provide improved communication between programs or tools in a computer system including a plurality of concurrently-operating tools.

Another object of the present invention is to provide a program communication facility including an execution manager which ensures that a tool is available to service every request from another tool.

Yet another object of the invention is to provide methods and apparatus for automatically starting and running a tool when a tool is not available to service a request from another tool.

Still another object of the present invention is to provide a communication facility which improves communication and cooperation among software tools in a distributed computing environment.

A further object of the present invention is to provide a software development environment which facilitates the design, porting, construction and maintenance of computer programs.

It is another object of the present invention to provide a computer system, including a plurality of concurrently-operating tools, that is task-oriented, rather than tool-oriented.

SUMMARY OF THE INVENTION

According to the present invention, these and other objects and advantages are achieved in a method and apparatus for controlling execution of software tools in a computer system including a plurality of software tools which communicate with each other through messages and which execute concurrently on the computer system. The method includes the steps of determining if an appropriate tool is available to service each of the messages that is a request message, and, if an appropriate tool is not available to service the request message, starting an appropriate tool.

The method for controlling execution of software tools in accordance with the invention is typically utilized in conjunction with a central message server. Software tools in the system communicate with each other through the message server. When a tool wishes to communicate with another tool within the system, it forwards a message to the message server. The message server forwards the message to only those tools which have indicated that they wish to receive the message.

In accordance with the method of the present invention, messages sent by the software tools to the central message server are monitored by an execution manager in order to determine if an appropriate software tool is available to service each request message. A status table is maintained for identifying tools that are in operation. The status table includes a tool class and a context for each tool that is in operation. An initialization table lists tools that are present in the computer system. The initialization table includes a tool class, a scope and an invocation command for each tool in the computer system.

When a request message is received by the central message server, it is placed in a queue until an appropriate tool is available to service the message. The status table is checked to determine if an appropriate tool is in operation. If starting of a tool is required, an appropriate tool is identified in the initialization table, and the invocation command is forwarded to the tool. After the tool has completed its initialization procedure, a ready status notification is sent by the tool and is received by the execution manager. The status of the tool is entered into the status table, and the request message is removed from the queue and forwarded to the tool.

The scope field of the initialization table indicates whether the tool operates on a per-file, per-directory, per-host computer, or per-system basis. The scope is used to determine if a request message should be sent to a tool that is already in operation or if another instance of the tool should be invoked to service the request message.

BRIEF DESCRIPTION OF THE DRAWINGS

For a better understanding of the present invention together with other and further objects, advantages and capabilities thereof, reference is made to the accompanying drawings which are incorporated herein by reference and in which.

DETAILED DESCRIPTION OF THE INVENTION

The method of communication of the present invention can be implemented on a single computer which runs all software tools including the message server, or in a distributed computing environment, in which one or more software tools run on different local or remote computers that are networked together.

Figure 1A:
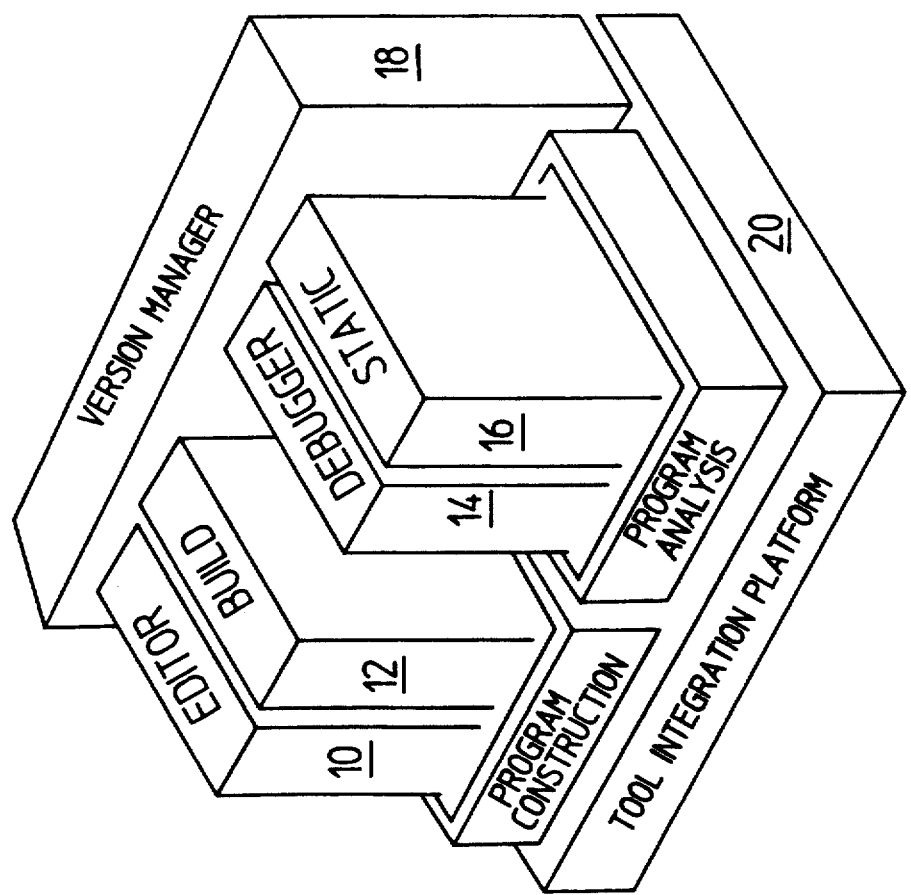
FIG. 1A is a conceptual block diagram illustrating a computer-aided software engineering system in which the present invention can be utilized.

A pictorial representation of a computer-aided software engineering system is shown in FIG. 1A. The system includes a set of program development tools, including an edit tool 10, a build tool 12, a debug tool 14, a static analyzer tool 16 and a version manager tool 18. The term "tool" is used herein to denote software routines or programs for performing a predefined function or set of functions. As described hereinafter, the tools are integrated to provide a complete CASE system. The edit tool 10 and the build tool 12 are associated with program construction, while the debug tool 14 and the static analyzer tool 16 are associated with program analysis and testing. The version manager tool 18 provides access/change control, retention of previous program versions and retrieval of programs by revision number, date, symbolic name or release date. The tools 10, 12, 14, 16 and 18 are controlled and integrated by an operating system known as a tool integration platform 20. The details of the program development tools 10, 12, 14, 16 and 18 are outside the scope of the present invention and will not be described further. It will be understood that different tools can be substituted into or added to the CASE system shown in FIG. 1. For example, different debug tools can be utilized depending on the type of program being developed.

The tool integration platform 20 performs the functions of communication between tools, work area management, distributed tool execution, user interface management and encapsulation of custom application tools. As described in detail hereinafter, the tool integration platform 20 includes a message server which provides an effective means for communication between tools and an execution manager which ensures that tools are available to service requests. The tool integration platform 20 supports distributed tool execution. Tools executing on several machines communicate and interact exactly as if they were all executing on a single processor. The tool integration platform 20 manages the user interface, which is highly graphical, window-based, interactive and task-oriented.

The CASE system supports program development by multiple users in a distributed computing environment. Thus, tools can be run on a local host computer or a remote host computer, and files can be accessed in remote systems. However, the distributed nature of the process is transparent to the user. The CASE system described herein can be run on a Series 300 or a Series 800 workstation manufactured by Hewlett-Packard Company. Typical hardware requirements on either workstation include 8 or 16 megabytes RAM, a high resolution display, keyboard and mouse, and a 150 or 300 megabyte disk. The CASE system is run with the HP-UX operating system, a UNIX-based operating system, and the X Window System. (The X Window System is a trademark of MIT.) The X Window System is a standard window controller developed by the X-

Consortium at Massachusetts Institute of Technology. Additional information regarding the X Window System is available in *X Toolkit Intrinsics, X Window System, X Version* 11, Release 2, 1985. However, the present invention is not limited to use with the above hardware and software, and can be utilized with any suitable general purpose computer.

Figure 1B:
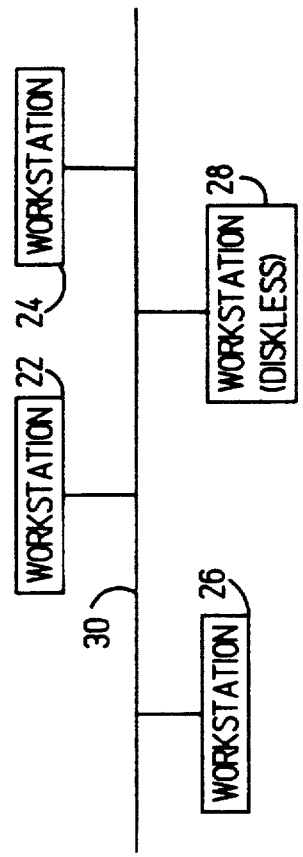
FIG. 1B is a conceptual block diagram illustrating a distributed computing environment in which the present invention can be utilized.

As indicated above, the CASE system supports a multi-workstation environment. A typical system configuration is shown in FIG. 1B. Workstations 22, 24, 26 and 28 are interconnected on a local area network 30. The workstations 22, 24 and 26 are configured as described above, while workstation 28 does not include a disk storage unit. The workstations can each access resources in other workstations. The workstation 28 utilizes the disk in one of the other workstations. Any number of workstations can be utilized in a distributed system of the type shown in FIG. 1B.

Program Interface

Figure 2:
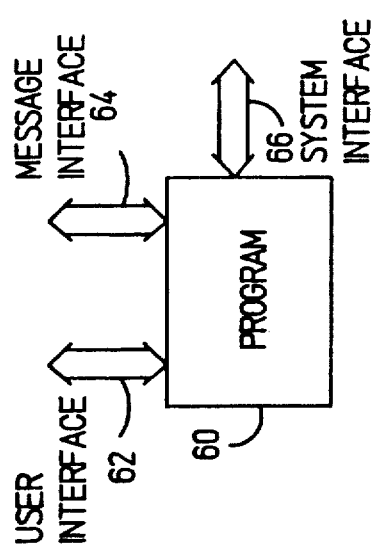
FIG. 2 is a conceptual block diagram of the preferred interface to a program in accordance with the present invention.

In the preferred embodiment of the present invention, each tool 60 supports a user interface 62 and a message interface 64, as illustrated in FIG. 2. User interface 62 is a traditional interface through which the user can invoke the functionality of program 60, typically via a keyboard or a mouse in conjunction with a menu and a windowing scheme. The tool 60 typically communicates with the user through the X Window System (not shown) identified above.

Message interface 64 provides a means through which a request message having a predefined pattern can invoke the functionality of program 60. Such a message is sent by another program in the system through the message server as described below.

Message interface 64 also includes an output notification facility. Each program is required to send out a notification message upon termination of a task, stating whether the program has successfully or unsuccessfully completed the task.

The message interface 64 preferably includes a trigger mechanism wherein an event occurring in the system, typically indicated by a success/failure notification message originating in another program, invokes the functionality of program 60. The trigger mechanism is user programmable and creates a cause and effect relationship. The trigger mechanism can be used to automatically trigger actions upon the occurrence of specified events without user intervention.

Program 60 can be invoked through the traditional user interface 62, or through the message interface 64. In addition, program 60 communicates with the operating system through a system interface 66. Operating system signals such as "stop" or "interrupt" are sent to the program 60 through system interface 66.

Different programs interact to provide event-driven communication and execution of software tools. When a notification message generated by a first program is sent to a second program via the message server, event-driven triggering of the second program is achieved. For example, when a notification of a successful completion from an edit tool is sent to the message server and then forwarded to the build tool, the build tool is invoked. In this manner, software tools are invoked upon the occurrence of events that are communicated by appropriate messages, thereby enabling close interaction between the software tools without user intervention. The message interface 64 enables programs to communicate in an environment in which communications are message-based and are handled by a central message serving facility.

Message Server

The message server is a program or process which enables communication between software tools and supports the above-described message interface. In the preferred embodiment of the present invention, software tools communicate with other software tools in the system via messages sent to the message server. The message server selectively forwards each message only to those software tools to which the message is of interest, thereby minimizing network traffic.

Figure 3:
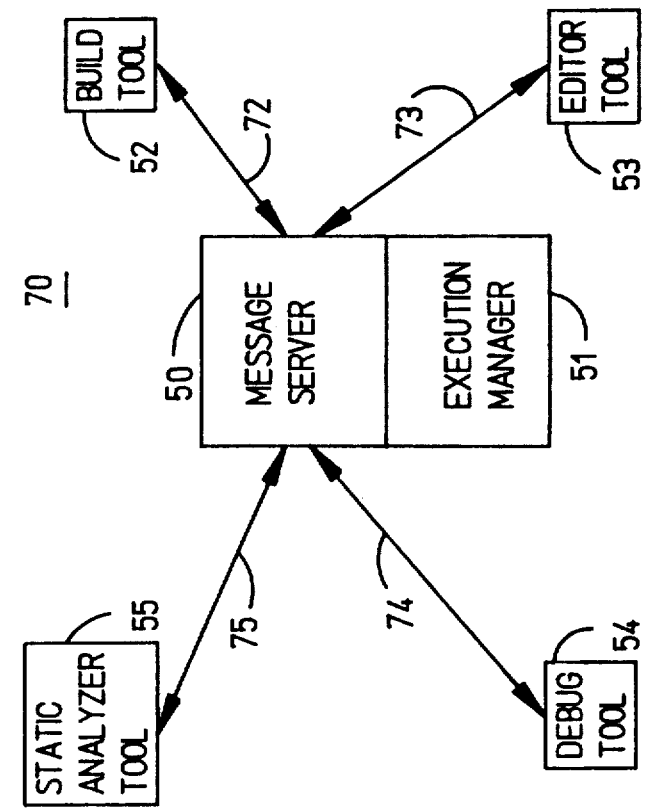
FIG. 3 is a conceptual block diagram of a typical computing environment illustrating the bi-directional communication paths established between the message server and various software tools in accordance with the present invention.

FIG. 3 is a conceptual block diagram of a computing environment 70 in which a message server 50 functions as a central message forwarding facility among a plurality of software tools 52–55. The tools of the environment include build tool 52, edit tool 53, debug tool 54, and static analyzer tool 55.

Computing environment 70 can be implemented with a single computer on which message server 50 and software tools 52–55 are executable. Alternatively, computing environment 70 can be implemented in a distributed computing environment as shown in FIG. 1B, in which message server 50 and software tools 52–55 run on different computers.

In order for one software tool to communicate with other software tools, a bi-directional communication path or socket must first be established between each software tool and the message server 50. A socket is a bi-directional, point-to-point communication path. As shown in FIG. 3, a socket 72 is established between build tool 52 and message server 50. In a similar manner, sockets 73, 74 and 75 are established between tools 53, 54 and 55, respectively, and the message server 50.

Figure 4A:
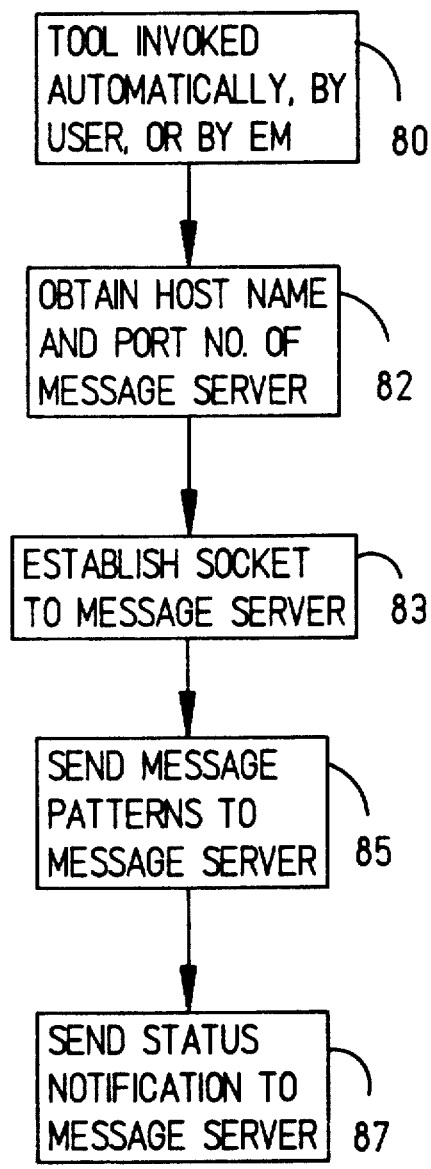
FIG. 4A is a simplified flow chart of the steps of the present invention used to establish a communication path between a program and the message server.

Initial steps required prior to normal communication between tools are shown in FIG. 4A. A tool can be invoked automatically when the system is started up, by a user, or by the execution manager, as described hereinafter (step 80). The tool initiates a connection to the message server 50. In order to establish a socket, the tool requires the host name where the message server is located and the port number of the message server. The port number is a destination address for messages being sent to the message server. When the host name and the port number of the message server have been obtained by the tool in step 82, a socket is opened to the port using UNIX socket techniques (step 83). The socket appears to the message server and to the tool as a file to or from which a stream of bytes may be written or read. Information regarding the UNIX system is available in *Introducing UNIX System V,* Rachel Morgan et al, McGraw Hill, 1987.

After a socket is established between the tool and the message server 50, the tool notifies the message server of the types of messages which it wishes to receive. This is done by sending message patterns from the tool to the message server 50, as shown in step 85. The message patterns identify the types of messages which should be forwarded to the tool from the message server 50. The format of message patterns is described in detail hereinafter. As a final step in the initialization process, the tool sends a status notification to the message server 50, as shown in step 87. The status notification indicates to both the message server 50 and the execution manager 51 that the tool is ready to communicate with other tools in the system.

Message Formats and Patterns

Figure 5:
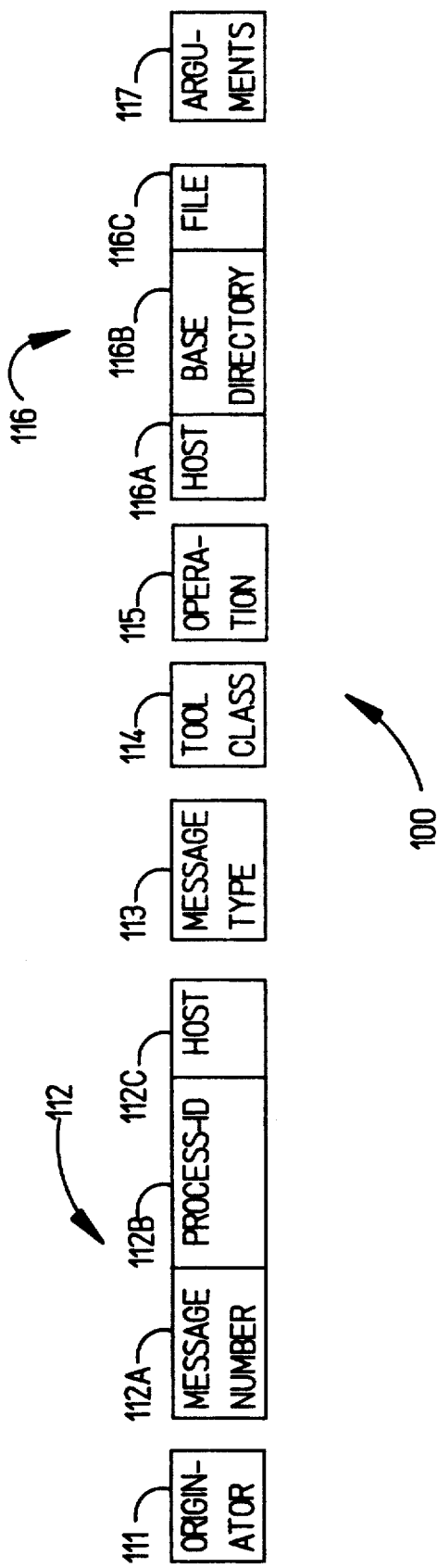
FIG. 5 illustrates the preferred message format utilized by the present invention.

The messages used in the present invention for interprogram communication are preferably comprised of American Standard Code for Information Interchange (ASCII) character strings which are terminated with an ASCII null character. Messages have a format that is divided into seven fields which are delineated by ASCII space characters, as shown in FIG. 5. Preceding the message is a field indicating the length of the message. The length is used at the receiving end for allocating buffer space.

A message 110 includes a first field, the Originator field 111, which indicates the tool or program that is the sender of the message. The Originator field 111 is prepended onto each message by the message server 50 rather than the originating tool.

The second field of message 110, the Request-ID field 112, is a unique identification field which facilitates the association of a response from a second tool with the original request from a first tool. The Request-ID field 112 is comprised of three subfields, the Message-number subfield 112A, the Process-ID subfield 112B, and the Host subfield 112C. The Message-number subfield 112A is a numeric reference assigned to a request message and is used to identify the message. The Process-ID subfield 112B is a numeric reference used to identify the process to which the message pertains. Where a plurality of processes are executing simultaneously, the Process-ID field facilitates the identification of a particular message with a specific process. The Host subfield 112C is a character string reference identifying the host computer from which the request message originated.

In the preferred embodiment of the present invention, a notification message from a server tool has the same Request-ID as the corresponding request message from a requestor tool. The Request-ID field facilitates the matching of request messages with subsequent notification messages in a computing environment where multiple instances of software tools are executing.

The third field of message 110, the Message-type field 113, is used to define a type of message. A message can be a request, designated with an "R"; a success notification, designated with an "N"; or a failure notification, designated with an "F". A request message is a request from one tool to another tool for service. Notification messages are sent by a tool upon the successful or unsuccessful completion of a task.

The fourth field of message 110, the Tool Class field 114, indicates the type of tool the message is destined for. The Tool Class is typically of the type EDIT, DEBUG, BUILD, etc.

The fifth field, the Operation field 115, designates the command being sent to the receiving tool. Typical operation commands include Save-File, Step, Stop, etc., and are specific to the functionality of the receiving tool.

The sixth field of message 110, the Context field 116, is comprised of Host subfield 116A, Base-directory subfield 116B and File subfield 116C. The Host subfield 116A contains a character string reference identifying the host computer where the data to be operated on is located. The Base-directory subfield 116B contains a character string reference identifying the base directory where the data to be operated on is located. Similarly, the File subfield 116C contains a character string reference identifying the file where the data to be operated on is located.

The seventh and final field of message 110 is the Argument field 117. Each message can have arguments which provide additional information to the receiving tool. In the present invention, complex data is passed by reference rather than by its actual value. For example, if a message is a notification from one tool in response to a query from another tool, the Argument field 117 of the message contains a pointer to a file containing the data.

As indicated hereinabove, messages are forwarded only to those tools which have requested messages of that type. The tools to receive each message are determined by a pattern-matching facility. Each tool registers in advance the types of message which it wishes to receive by sending message patterns to the message server. The message patterns are stored, and when a message is received, it is matched against the stored patterns. The message is forwarded only to those tools for which a match occurs. When no match is found, the message can be ignored, particularly in the case of notifications. In the case of request messages, an appropriate tool can be started by the execution manager as described hereinafter.

Message patterns are sent from a tool to the message server 50 utilizing a special form of the message format shown in FIG. 5. The message used to transmit message patterns includes a request ID field, a message-type field, a tool class field, and an operation field followed by a message pattern. Each such message contains a single message pattern. The tool class field indicates the message server as the destination tool. The operation field contains an "accept" command.

A tool can register a generalized message pattern with the message server, thereby eliminating the need to register every specific pattern variation. Fields can be specified in the message pattern exactly, or with a universal or wildcard character. A universal character such as an "*" in one or more fields of the message pattern indicates a match-anything condition for that field. Thus, any word in a field of a received message matches an "*" in the same field of the message pattern. However, an "*" in a specified field of the message pattern requires the received message to include the specified field. When the specified field is absent from the message, no match occurs. When a specified field is left blank in the message pattern, any word or an empty field in the received message produces a match.

For example, a tool registering a message pattern can indicate that it wishes to receive requests from every tool in the network by supplying the originator names and the character "R", symbolizing a request message. However, in a network with a large number of tools, registering a message for each individual originator tool in the network can be impractical. By registering "** R" with the message server, the tool indicates that it wishes to receive all request messages. The first "*" indicates that any originator is to produce a match. The second "*" indicates that any Request-ID is to produce a match. Similarly, a message pattern that consists of a single "*" indicates that the registering tool wishes to receive all messages, both requests and notifications, from all other tools in the network.

For a message having the format shown in FIG. 5 and described above, Table 1 lists a number of sample message patterns utilizing a universal character, and the messages that are matched by each pattern.

TABLE 1

| Pattern | Messages matched |
| --- | --- |
| "*" | Matches all messages. |
| "* * R *" have a Tool-class field. | Matches all requests which |
| "* * R" | Matches all requests. |
| "* * R EDIT" | Matches all requests for EDIT. |
| "* * R EDIT SAVE-FILE" | Matches all requests for type EDIT, SAVE-FILE. |
| "DEBUG.2 * N *" | Matches all notifications from a particular executing instance of the debug program. |

The use of universal characters to designate message patterns greatly simplifies the registering of message patterns and the matching of messages received by the message server to these message patterns.

Figure 6:
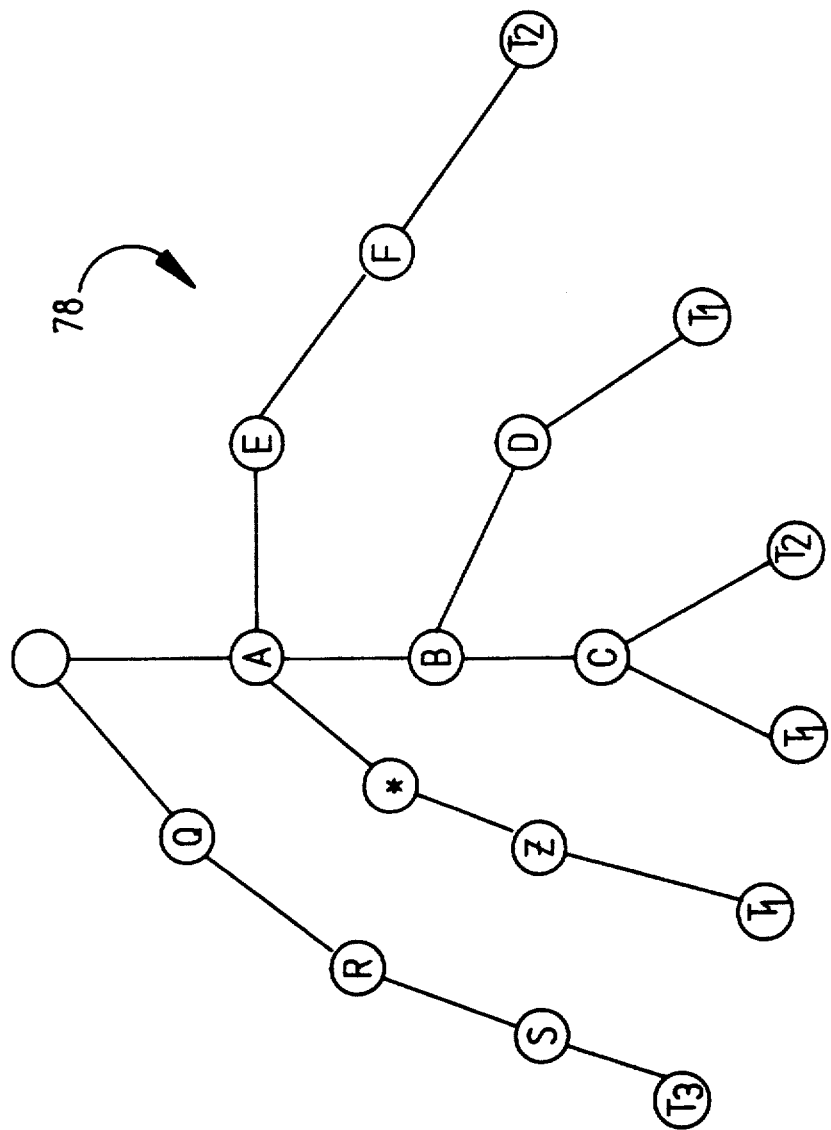
FIG. 6 illustrates storage of message patterns in a pattern tree.

To facilitate fast access and matching of message patterns, the registered patterns are stored by the message server 50 in a pattern tree. For example, if tools $T_1$-$T_3$ indicate that they wish to receive messages which match the message patterns listed in Table 2 below, the message server stores these message patterns in pattern tree 78 indicated in FIG. 6.

TABLE 2

| Tool | Request Message Pattern |
| --- | --- |
| $T_1$ | A * Z |
|  | A B C |
|  | A B D |
| $T_2$ | A B C |
|  | A E F |
| $T_3$ | Q R S |

When no universal character is present in the message pattern, the message server traverses the pattern tree only once to identify all tools which have requested the received message. If a universal character is present in the message pattern, the tree must be traversed additional times to identify all tools which wish to receive the message. For example, when a message having the pattern ABC is received, ABC branch of tree 78 is traversed once to determine that the message should be forwarded to tools $T_1$ and $T_2$. In addition, branch A*Z must be traversed to confirm that a match does not exist.

The status notification shown in step 87 of FIG. 4A is a variation of the message format shown in FIG. 5 and described hereinabove. The status notification message includes an originator field, a request ID field, a message-type field, a tool class field, an operation field, a context field, a file- type field and a status field. The message type field indicates "N" for a notification message. The operation field indicates "status". The context field indicates the context on which the tool will operate. One or more of the host, base directory, and file subfields in the context field can be indicated by the universal character "*". The file- type field indicates types of files upon which the tool operates, such as C, Fortran, Pascal, Executable, etc. The status field indicates Ready, Busy or Not Running. As discussed hereinafter, portions of the status notification message are used by the execution manager.

Communication Via the Message Server

Referring again to FIG. 3, when a software tool establishes a socket with the message server 50 and registers the message patterns it wishes to receive, the tool is a fully-functioning member of environment 70 and can communicate with other registered software tools. In a similar manner, all software tools in environment 70 establish a socket with the message server 50 and register the patterns of messages which they wish to receive.

When a software tool successfully or unsuccessfully performs a task, it sends a notification message to the message server 50 in the prescribed message format. Request messages in the prescribed format are forwarded to the message server 50 when a tool requests service from another tool. The message server 50 serially receives messages supplied to it via sockets 72-75 from software tools 52-55, respectively. The message server 50 forward each message received from a tool to those tools that have requested messages of that type, as indicated by the stored message patterns.

Figure 4B:
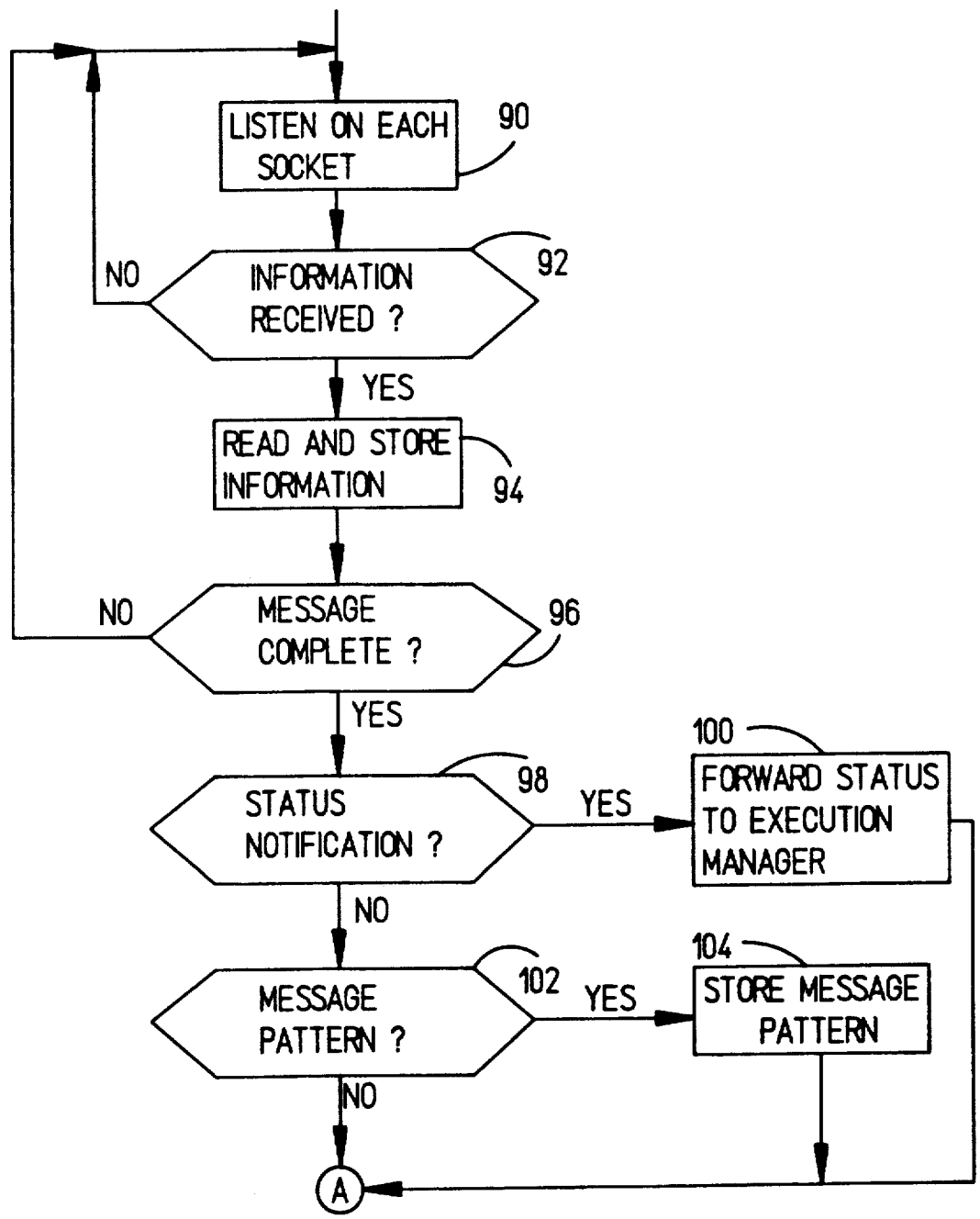
FIGS. 4B and 4C show a simplified flow chart of the steps for inter-program communication in accordance with the present invention.
Figure 4C:
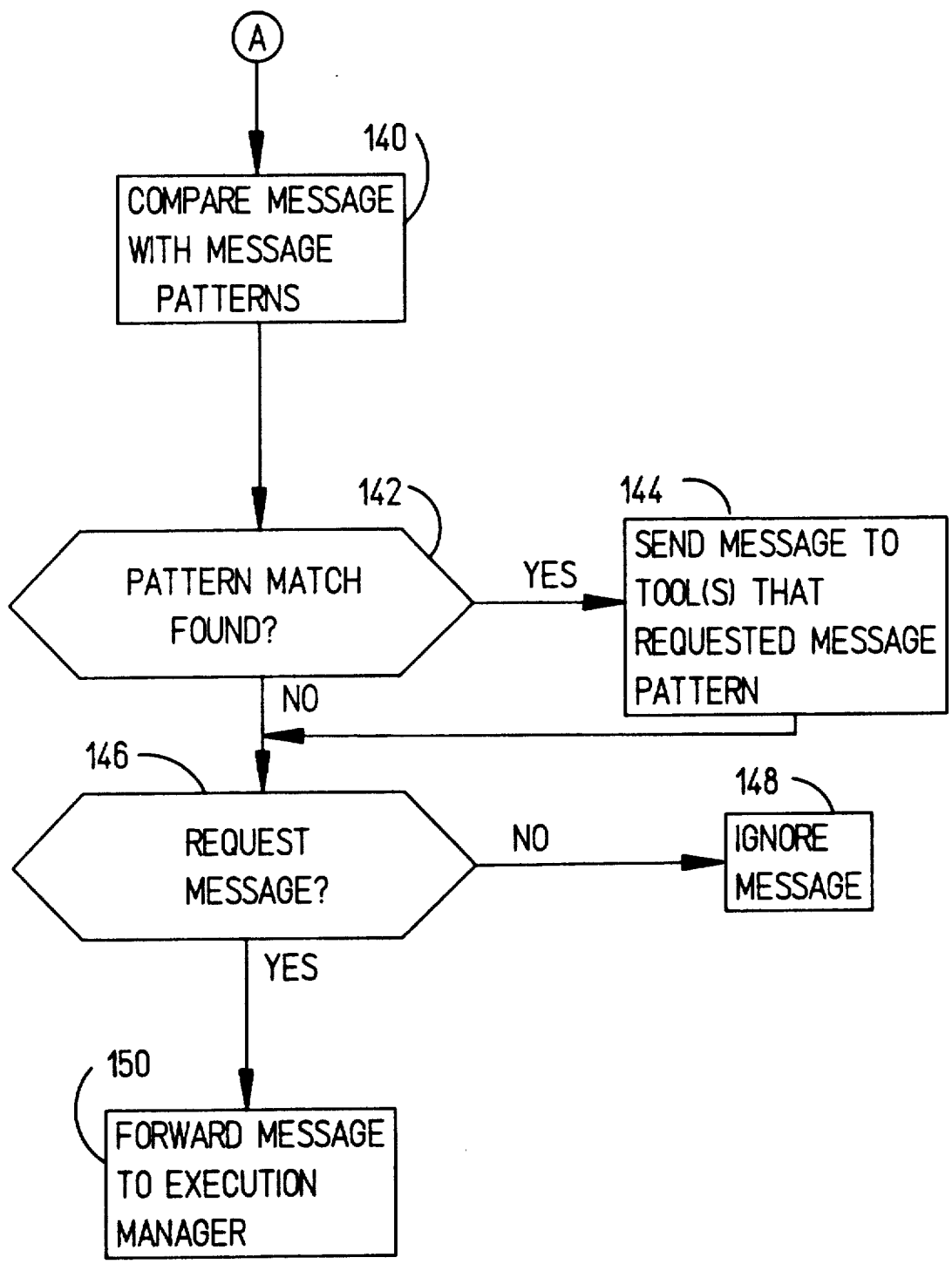

Communication between tools through the message server 50 is illustrated in the flow chart of FIGS. 4B and 4C. The message server 50 listens for incoming messages on sockets (step 90) that have been established between different tools and the message server. As long as no messages are received, the message server continues listening. When information is received on one of the sockets, as indicated by step 92, the information is read and stored in step 94. The originating tool is identified from the socket on which the information was received. The message server then determines if the received information was a complete message in step 96. This is done by comparing the length parameter preceding the message with the length of the information received. The length parameter also permits the message server 50 to allocate an appropriate buffer space to store the message. If the message was not complete, the message server returns to listening on each socket for additional incoming information (step 90). If the message is complete, it is processed.

The above-described process is known as asynchronous transmission. It insures that the message server continues to receive, process and forward messages even when a particular message transmission is terminated prematurely. Thus, if an incomplete message is received, the message server 50 stores the received information and continues listening for other messages, rather than hanging up while waiting for completion of the message. If the remainder of the message is received later, it is stored and processed. As a result, the message server 50 reads and stores incoming information, whether or not the received message is complete.

When a complete message is received, it is checked as to message type. When the received message is a status notification as indicated in step 98, it is forwarded to the execution manager in step 100. When the received message is a message pattern, as indicated in step 102, the message pattern is stored by the message server in step 104.

When the message is a request message or success/-failure notification message, it is compared in step 140 with the message patterns stored in the message server. When one or more pattern matches are found in step 142, the message is forwarded to the tool or tools for which a match occurs (step 144). When no pattern match is found, the message is identified in step 146 as a request or a notification. In the case of a notification, the message is ignored in step 148. This simply indicates that no tools wish to receive notifications of that type. When a pattern match is found but the destination tool is busy, the message server queues the message for transmission when the tool becomes ready. When the message is a request message and no pattern matches have been found, the message is forwarded in step 150 to the execution manager for starting of an appropriate tool to service the request, as described hereinafter.

The message server acts as a filtering mechanism in which messages are forwarded only to those tools that wish to receive such messages. As a result, network traffic is greatly reduced in comparison to a true broadcast system wherein a message from one tool is sent to all other tools in the system.

Execution Manager

An execution manager 51 (FIG. 3) ensures that all requests for service are responded to, whether or not the appropriate tool has previously been started. The execution manager is a process which automates and controls the event-driven invocation and execution of programs or software tools in close cooperation with the message server. The execution manager monitors messages sent to the message server and maintains information regarding the status of each software tool. When a software tool sends a message requesting a service, the execution manager ensures that an appropriate tool services the request. If an appropriate tool is running, the execution manager is not required to act. If the appropriate tool is not running, the execution manager determines which tool should be initialized, how to initialize the appropriate tool, on what host computer to initialize the tool, what context to pass to the tool, and what options, if any, to invoke.

Figure 7A:
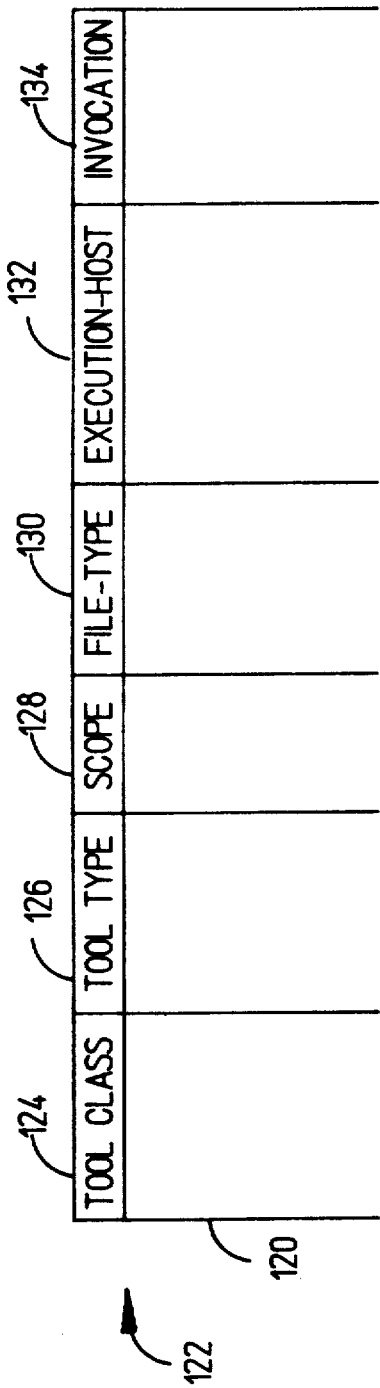
FIG. 7A is a conceptual representation of the execution initialization table utilized by the execution manager, illustrating the preferred table entry format.

When a tool must be started to service a request, the execution manager reads an execution initialization table 120, as shown in FIG. 7A. Each entry in table 120 represents a different software tool in the system. Table 120 is a system-wide table which contains both default and user-programmable information relating to each software tool in the system. Each entry of the execution initialization table 120 is preferably comprised of six ASCII character fields.

The first field of each initialization table entry, the Tool Class field 124, designates the class of which the tool is a member. Typical tool classes include DEBUG, EDIT, BUILD, etc.

The second field of each initialization table entry, the Tool Type field 126, indicates the type of tool to which the entry pertains. In the present invention, the tool type is either of the type Tool or Command. Tools are integrated programs which support message-based communication via the message interface described above. Commands, on the other hand, are directed to nonintegrated programs which do not support message-based communication, but may be invoked by the proper command. Thus, the execution manager can invoke programs which support the preferred message interface as well as those which do not.

The third field of each initialization table entry, the Scope field 128, can have the value: NET, indicating one instance of the software tool per network; HOST, indicating one instance of the software tool per host computer; DIR, indicating one instance of the software tool per directory; and FILE, indicating one instance of the software tool per file. The Scope is predetermined, depending on the nature and capabilities of the tool. For example, a table entry of the tool class DEBUG can have a Scope of FILE, indicating that each file requiring debug operations should have its own instance of the DEBUG software tool. An entry of the tool class BUILD can have a Scope of DIR, designating one instance of the Build tool per directory requiring build operations. An entry of the tool class EDIT can have a Scope of HOST, designating one instance of the EDIT software tool per host computer.

The fourth field of each initialization table entry, the File-type field 130, specifies the type of data file on which the software tool designated in the entry operates. For example, if the File-type field indicates a C source code file, the tool for that table entry will execute on only C source code files. Typical file types include C source code, Fortran source code, Pascal source code, executable files, etc. The File-type field 130 facilitates matching of software tools and file types.

The fifth field of each table entry, the Execution-host field 132, specifies on which host computer the software tool should be started. If a specific host is specified in the Execution-host field 132, all instances of that tool class are started on the specified host computer. If the value "%Host%" is specified, the tool is run on the host computer where the data is located, as determined from the host field of the context contained in the request message.

The sixth and final field of each table entry, the Invocation field 134, contains a specific command line character string necessary to invoke the Tool or Command. The Context field of the message requesting the service is loaded into the command line to specify the host computer, base directory and file on which the tool is to operate.

The fields of the entries in execution initialization table 120 are set by default or may be programmed according to the user's requirements. The user defines the entries in the execution initialization table 120 to specify a preferred tool for each action, and the execution manager then automatically invokes and executes the tool when necessary.

Figure 7B:
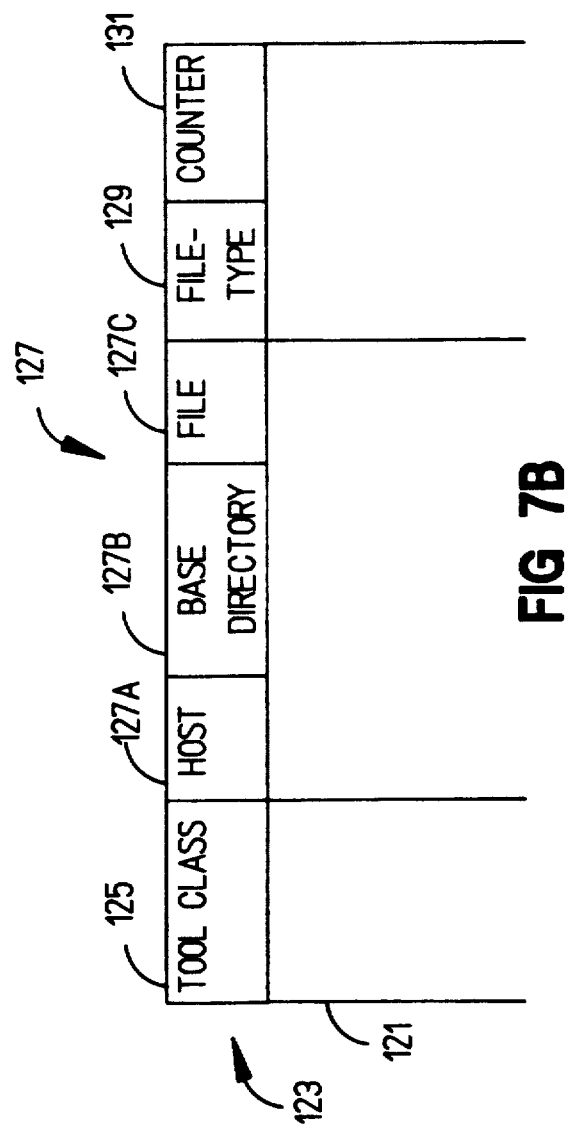
FIG. 7B is a conceptual representation of the data structure utilized by the execution manager to monitor the status of a tool.

The execution manager further includes a status table, as illustrated in FIG. 7B, to maintain a running record of the tools that are running and the context on which each tool is running. Status table 121 is a network-wide, one per user table which enables the execution manager to determine whether another tool needs to be initialized to service a request. Each entry in status table 121 is preferably comprised of three ASCII character fields. The first field of each status table entry, the Tool class field 125, designates the class of a tool, such as DEBUG, EDIT, BUILD, etc.

The second field of each status table entry, the Context field 127, is comprised of host subfield 127A, base directory subfield 127B, and file subfield 127C. The Host subfield 127A contains a character string reference identifying the host computer on which the tool is operating. The Base directory subfield 127B contains a character string reference identifying the base directory in the specified host computer on which the tool is operating. The File subfield 127C contains a character string reference identifying the data file or files in the specified base directory on which the tool is operating. Note that all files within a base directory or all base directories within a host may be specified with a universal character such as an "*". In a computing environment in which multiple instances of a particular tool class are executing, the Context field 127 designates the context or project on which each instance of the tool is operating.

The third field of each status table entry, the File-type field 129, is an indication of the type of file on which the tool is operating. File types include C, Fortran, Pascal, Executable, etc.

The fourth field of each status table entry, the Count field 131, is a numeric variable which is incremented or decremented according to changes in the number of tools operating in a particular context. While only one tool of the same class is typically operating in a particular context, the Count field 131 indicates when more than one tool of the same class is operating in the same context.

Figure 8A:
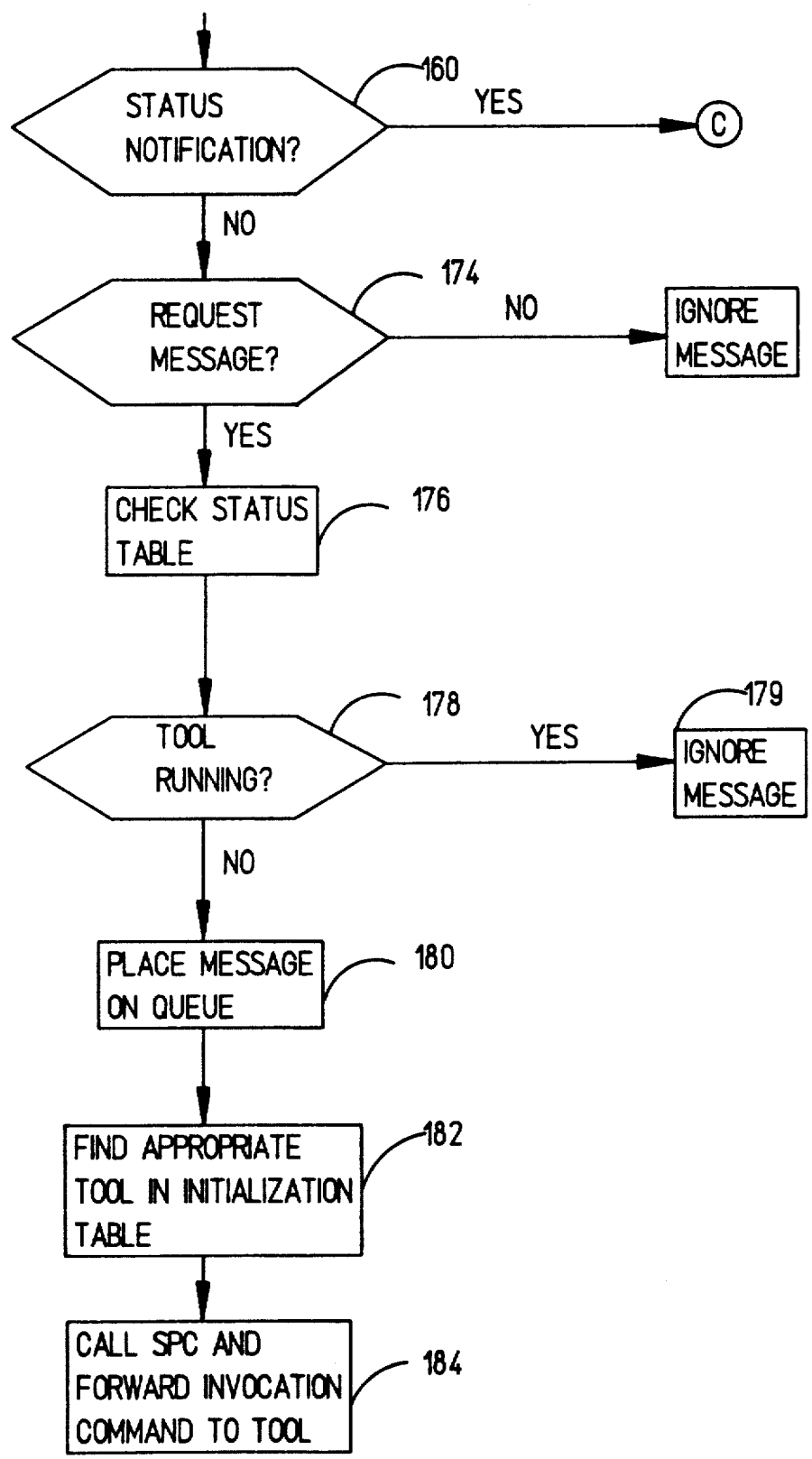
FIGS. 8A and 8B show a simplified flow chart of the steps performed by the execution manager in accordance with the present invention.
Figure 8B:
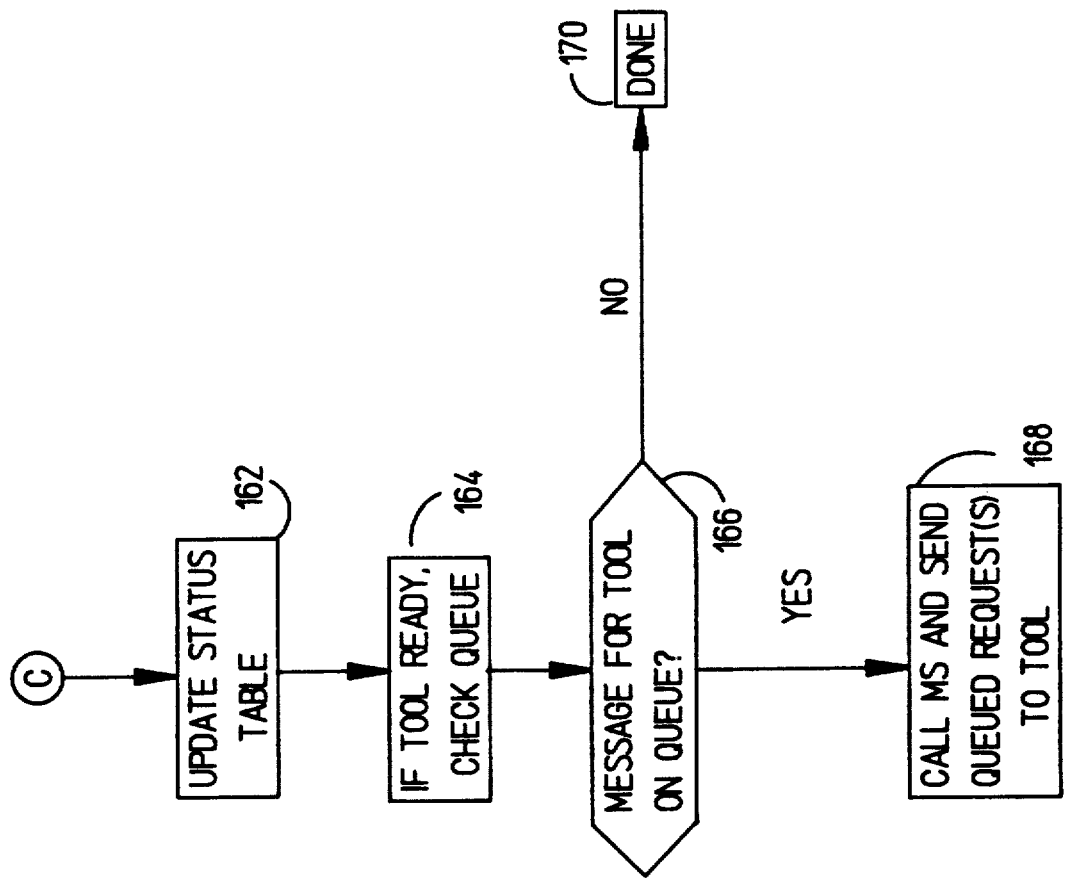

The status table 121 provides the execution manager 51 with a means for identifying the tools that are operating at any time and thereby facilitates the determination of whether a new tool or a new instance of a tool should be initialized via the execution initialization table 120. The execution manager uses the status table 121 and the execution initialization table 120 in conjunction to control the event-driven invocation of software tools. The steps used by the execution manager to ensure the servicing of all message requests are illustrated in FIGS. 8A and 8B.

The execution manager 51 receives status notification messages and request messages for processing. Success/failure notification messages do not require action by the execution manager. When a status notification message is received, as indicated by step 160, the status table 121 is updated in step 162 (FIG. 8B). As indicated previously, the status notification message contains tool class, context and file-type fields. When the tool is newly-started and ready for operation, this information is added to the status table. If a Not-Running status is indicated, the entry is removed from the table. In the rare case where more than one instance of the same tool is operating on a particular context, the count field 131 is updated. If the status notification message indicates that the tool is ready to accept messages, the message queue for that tool invocation is checked in step 164. If the queue contains a message for that tool, as indicated in step 166, a call is made to the message server, and the queued request or requests are sent to the tool in step 168. When there are no messages in the queue for that tool, no further action is required, as indicated by step 170.

When a request message is received by the execution manager as indicated by step 174 (FIG. 8A), the status table is checked in step 176 to determine if a tool of the required tool class is operating in the required context. If an appropriate tool is found to be running, as indicated by step 178, the request will have been forwarded by the message server, and the execution manager can ignore the request. If an appropriate tool to service the request message is not running, the request message is placed in step 180 in a queue for that tool invocation. Then, an appropriate tool to service the request message is found in the initialization table in step 182. The tool must match the tool class in the request message. In addition, the specified execution host must not conflict with the location of the data specified in the request message. The scope field of the initialization table is used to determine whether an existing instance of the tool can be utilized or a new instance of the tool must be initialized to service the request message. For example, if the tool of interest has a scope of one per file, a new instance of the tool must be initialized to service a request pertaining to a different file.

When a suitable tool has been selected from the initialization table, a subprocess controller library routine is called to open a channel to the tool and then to forward the invocation command contained in the initialization table to the tool. The subprocess controller permits communication with either local or remote subprocesses, as described hereinafter.

In response to the invocation command forwarded to the tool, the tool establishes a socket to the message server, sends message patterns and finally sends a Ready status notification, as shown in FIG. 4A and described hereinabove. The Ready status notification is received by the execution manager, as indicated above in step 160. The status information regarding the newly-started tool is used to update the status table in step 162. Then, the request message that was previously placed on the queue in step 180 is sent to the tool in step 168 via a call to the message server.

Status notification messages have been described hereinabove in connection with tool initialization Status notification messages can be used at other times and for other purposes. When a tool stops operating, the execution manager sends a status notification that the tool is no longer running. Status notification messages can also be sent by the tool to indicate a busy condition or to indicate that the tool is changing to a different context.

The execution manager, in communicating with tools to be started, utilizes a subprocess controller which permits execution of subprocesses either locally or remotely through calls to a library. Details regarding the subprocess controller are contained in the aforementioned application entitled "Method and Apparatus For Computer Program Encapsulation", which application is hereby incorporated by reference.

The execution manager 51 monitors the operational status of all tools in the system and ensures that all request messages are serviced by an appropriate tool. For example, if a Build tool requests that executable code be debugged, the Build tool sends a message requesting service by a Debug tool. The execution manager checks to see if an instance of the Debug tool is executing in the context specified in the message. If not, the execution manager invokes a Debug tool, and forwards the request message thereto. As a result, the user is not required to start tools that are needed to execute tasks.

It will be understood that the message server described herein can be utilized without the execution manager when it is not necessary to provide automatic control of tool execution.

Having thus described an embodiment of the present invention, various alterations, modifications and improvements will readily occur to those skilled in the art. Such alterations, modifications and improvements as are made obvious by this disclosure are intended to be part of this disclosure though not expressly stated herein, and are intended to be in the spirit and scope of the invention. Accordingly, the foregoing description is intended to be exemplary only and not limiting. The invention is limited only as defined in the following claims and equivalents thereto.

What is claimed is:

1. A method for controlling execution of software tools in a computer system comprising an electronic digital computer and a memory containing computer software for operating said computer, said computer software comprising a plurality of software tools which include means for communicating with each other through messages including request messages, each containing a request by one of said software tools for service by another of said software tools, said computer executing message control software for performing a method comprising the steps of:

receiving and forwarding said messages and controlling execution of request messages, said message control software having access to an initialization table for listing software tools that are present in said computer system and to a status table for listing software tools that are in operation in said computer system;

determining from said status table if a software tool is in operation for servicing a received request message received by said message control software; and when a software tool is not in operation for servicing said received request message, automatically selecting from said initialization table a software tool for servicing said received request message and automatically starting the selected software tool.

2. Apparatus for controlling execution of software tools which include means for communicating with each other through messages and which execute concurrently, comprising:

a computer system comprising at least one electronic digital computer and a memory containing computer software for operating said computer, said computer software comprising a plurality of software tools, said messages including request messages each containing a request by one of said software tools for service by another of said software tools;

message control means for receiving and forwarding said messages and for controlling execution of request messages, said message control means having access to an initialization table for listing software tools that are present in said computer system and to a status table for listing software tools that are in operation in said computer system;

said message control means including means for determining from said status table if a software tool is in operation for servicing a received request message received by said message control means; and said message control means including means for automatically selecting from said initialization table a software tool for servicing said received request message and means for automatically starting the selected software tool when a software tool is not in operation for servicing said received request message.

3. Apparatus as defined in claim 2 wherein said message control means further includes means for placing the received request message in a queue until the selected software tool is ready to service the received request message.

4. Apparatus as defined in claim 3 wherein said initialization table includes an invocation command for each tool that is present in the computer system, said invocation command specifying a local host computer or a remote host computer where said invocation command is to be executed, and wherein said means for starting the selected software tool includes means for executing the invocation command from the initialization table on the specified host computer.

5. Apparatus as defined in claim 4 wherein said message control means further includes means for receiving a ready status notification from the selected software tool and means for entering the status of the selected software tool into the status table.

6. Apparatus as defined in claim 5 wherein said message control means further includes means for removing the received request message from the queue after a ready status notification is received from the selected software tool and means for forwarding the received request message to the selected software tool.

7. Apparatus as defined in claim 2 wherein said initialization table includes a tool class and scope for each tool that is present in the computer system and wherein said means for starting the selected software tool includes means for starting an additional instance of the selected software tool if the received request message is outside the scope of a first instance of the selected software tool.

8. A method for controlling execution as defined in claim 1 further including the step of monitoring messages sent by the software tools to the message control software for forwarding to predetermined ones of the software tools.

9. A method for controlling execution as defined in claim 1 further including the step of forwarding the received request message to the selected software tool after the selected software tool has been started.

10. A method for controlling execution as defined in claim 1 wherein each request message includes a destination tool class and a context, and wherein said status table includes a tool class identifier and a context for each tool that is in operation.

11. A method for controlling execution as defined in claim 10 wherein the step of determining if a software tool is in operation for servicing said received request message includes the steps of determining if the destination tool class and context of the received request message match the tool class identifier and context of any tool listed in the status table.

12. A method for controlling execution as defined in claim 11 further including the step of placing the received request message in a queue until the selected software tool notifies the message control software that it is ready to service the received request message.

13. A method for controlling execution as defined in claim 12 wherein said initialization table includes a tool class and scope for each tool that is present in the computer system.

14. A method for controlling execution as defined in claim 13 wherein said initialization table includes an invocation command for each tool that is present in the computer system.

15. A method for controlling execution as defined in claim 14 wherein said invocation command specifies a local host computer or a remote host computer where said invocation command is to be executed.

16. A method for controlling execution as defined in claim 14 wherein the step of starting the selected software tool includes the step of
executing the invocation command from the initialization table on the specified host computer.

17. A method for controlling execution as defined in claim 16 further including the steps of:
receiving a ready status notification from the selected software tool, and
entering the status of the selected software tool into the status table.

18. A method for controlling execution as defined in claim 17 further including the steps of:
removing the received request message from the queue after a ready status notification is received from the selected software tool, and
forwarding the received request message to the selected software tool.

19. A method for controlling execution as defined in claim 18 wherein the step of determining if a software tool is in operation for servicing said received request message includes the step of monitoring messages sent by the tools to said message control software for forwarding to predetermined ones of the tools.

20. A method for controlling execution as defined in claim 13 wherein the step of starting the selected software tool includes the step of starting an additional instance of the the selected software tool.

21. A method for controlling execution as defined in claim 14 wherein said status table and said initialization table each include a file type for each listed tool, said file type identifying the type of files on which the tool operates.

22. A method for controlling execution as defined in claim 14 wherein the step of starting the selected software tool includes the step of
   if the received request message is outside the scope of a first instance of the selected software tool, starting an additional instance of the selected software tool.

* * * * *